United States Patent Office 2,874,167
Patented Feb. 17, 1959

2,874,167

HALOGENATED DIEPOXIDE COMPOUNDS

Howard R. Guest, Charleston, and Harry A. Stansbury, Jr., South Charleston, W. Va., assignors to Union Carbide Corporation, a corporation of New York No Drawing. Application June 4, 1957
Serial No. 663,342

15 Claims. (Cl. 260—348)

This invention relates to the production of halogenated diepoxide compounds.

As is known, cyclic unsaturated aldehydes can be synthesized by reacting an aliphatic conjugated diene such as butadiene or homologues thereof, with an alpha,beta-unsaturated aliphatic aldehyde, which reaction is well recognized as the Diels-Alder reaction. The cyclic unsaturated aldehydes, in turn, can be subjected to the well known Tischenko reaction in the presence of an aluminum alkoxide catalyst to produce unsaturated cycloaliphatic esters. The epoxidation of the unsaturated cycloaliphatic ester to produce the corresponding diepoxide ester can be accomplished by either the acetaldehyde monoperacetate method or the peracetic acid method as taught in U. S. Patent 2,716,123, issued to Frostick, Jr., et al.

The monomeric halogenated diepoxide compounds of the present invention can be characterized by the following structural formula:

I
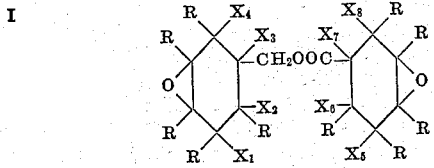

wherein each R is individually selected from the group consisting of hydrogen and an aliphatic hydrocarbon radical, preferably an alkyl radical such as methyl, ethyl, propyl, butyl and the like; $X_1$ through $X_8$ are selected from the group consisting of hydrogen, halogen, such as chlorine, bromine, fluorine and iodine, and an aliphatic hydrocarbon radical, preferably an alkyl radical such as methyl, ethyl, propyl, butyl and the like; and at least one of the variables designated as $X_1$ through $X_8$ always being a halogen. In a preferred embodiment at least one pair of the corresponding variables designated as $X_1$ through $X_8$ such as $X_1$ and $X_5$, $X_2$ and $X_6$, $X_3$ and $X_7$, $X_4$ and $X_8$, will always be a halogen such as chlorine and bromine. It is still further preferred that when any of the above variables represent alkyl radicals, particularly lower alkyl radicals, the total number of carbon atoms contained in said alkyl groups per carbocyclic ring does not exceed twelve.

The halogenated diepoxide compounds of this invention are prepared by the epoxidation of the olefinic linkages contained in the corresponding halogenated (3-cyclohexen-1-yl)methyl 3-cyclohexanecarboxylates such as, for example (1-chloro-3-cyclohexen-1-yl)methyl 1-chloro-3-cyclohexencarboxylate, and can be prepared, for example, by either of two oxidation procedures, both of which are satisfactory and provide commercially acceptable yields.

The first oxidation method is called the acetaldehyde monoperacetate method and the reaction whereby the epoxides are formed can be illustrated by the following equation:

ACETALDEHYDE MONOPERACETATE METHOD

II
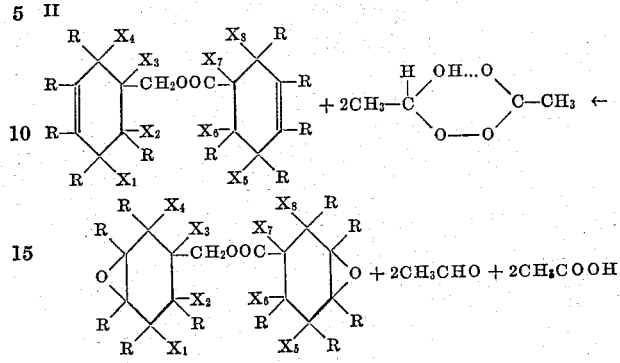

wherein the variables R and $X_1$ through $X_8$ have the same meanings as shown in Formula I above.

The second oxidation method is called the peracetic acid method and the reaction whereby the epoxides are formed can be illustrated by the following equation:

PERACETIC ACID METHOD

III
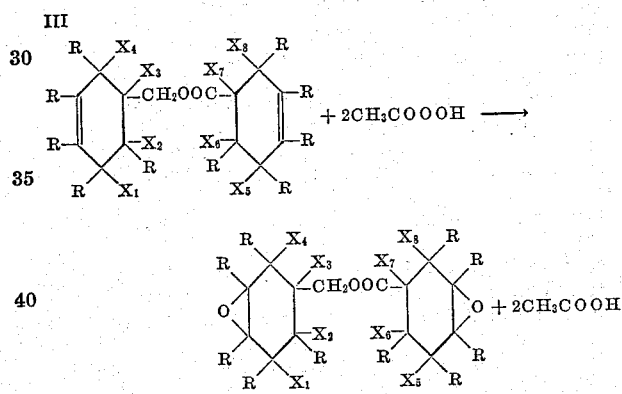

wherein R and $X_1$ through $X_8$ have the same meanings as shown in Formula I above.

The reaction conditions suitable for making the halogenated diepoxide compounds vary widely. The temperatures employed in producing said diepoxides can range from $-10°$ C. to about $100°$ C. A preferred method of making the halogenated diepoxides consists in mixing the starting material and an excess of peracetic acid solution at a temperature in the range from about $20°$ C. to about $50°$ C., and after completion of the reaction, rapidly removing all low boiling constituents and recovering the product by any convenient means such as, for example, distillation or extraction. The reaction period can vary from several minutes to as long as 100 hours, and longer; the preferred reaction period is from about 1 to about 30 hours.

Notwithstanding the relatively reactive halogen substituent(s) on the carbocyclic ring, the unsaturated starting material is converted, quite surprisingly indeed, to the corresponding diepoxide form in fairly clean-cut reactions and in acceptable yields by the use of peracid, e. g., peracetic acid.

The halogenated unsaturated cycloaliphatic esters which are used as starting materials in preparing the corresponding halogenated diepoxide compounds can be prepared by subjecting halogenated cyclic unsaturated aldehydes to the well known Tischenko reaction. The reaction whereby these diunsaturated esters can be prepared are illustrated by the following equation:

IV

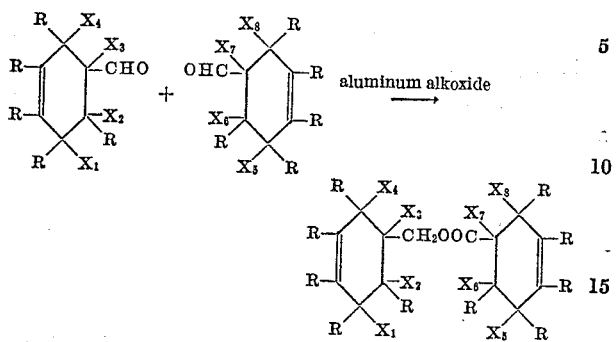

wherein R and $X_1$ through $X_8$ in the final product have the same meanings as shown in Formula I above.

Typical halogenated 3-cyclohexenecarboxaldehydes which can be employed in the Tischenko reaction to produce the halogenated (3-cyclohexen-1-yl)methyl 3-cyclohexenecarboxylates which, in turn, are employed as the starting material to prepare the corresponding halogenated diepoxides include:

1-chloro-3-cyclohexenecarboxaldehyde
1-bromo-3-cyclohexenecarboxaldehyde
2-chloro-3-cyclohexenecarboxaldehyde
1-chloro-2-methyl-3-cyclohexenecarboxaldehyde
1-bromo-2-methyl-3-cyclohexenecarboxaldehyde
1,2-dichloro-3-cyclohexenecarboxaldehyde
1,2-dibromo-3-cyclohexenecarboxaldehyde
1,6-dichloro-3-cyclohexenecarboxaldehyde
1,2,6-trichloro-3-cyclohexenecarboxaldehyde
1-chloro-2,5-dimethyl-3-cyclohexenecarboxaldehyde
1,5-dibromo-2,3-dimethyl-3-cyclohexenecarboxaldehyde
1,2-dichloro-3 or 4-methyl-3-cyclohexenecarboxaldehyde
1,2,5,6-tetrachloro-2-methyl-3-cyclohexenecarbaldehyde
1-bromo-2,2,5,5-tetramethyl-3-cyclohexenecarboxaldehyde
1,6-dichloro-2,2-dimethyl-5-ethyl-3-cyclohexenecarboxaldehyde
1,6-dichloro-2,2-dimethyl-4-butyl-3-cyclohexenecarboxaldehyde
1-bromo-3 or 4-propyl-6-propyl-3-cyclohexenecarboxaldehyde
1-chloro-2,2-dibutyl-3-cyclohexenecarboxaldehyde
1-bromo-2-methyl-2-ethyl-3-cyclohexenecarboxaldehyde
2,2-dimethyl-5-chloro-3-cyclohexenecarboxaldehyde
1-chloro-3 or 4-butyl-6-ethyl-3-cyclohexenecarboxaldehyde
1,2-dichloro-3 or 4-methyl-6-ethyl-3-cyclohexenecarboxaldehyde
1,5-dichloro-2,4,6-trimethyl-3-cyclohexenecarboxaldehyde
1-chloro-2,2,5,5-tetramethyl-3-cyclohexenecarboxaldehyde, and the like As is readily apparent from Equation IV above, two molecules of an aldehyde combine to form the ester. Thus, by employing a monohalogenated cyclohexenecarboxaldehyde, e. g., 1-chloro-3-cyclohexenecarboxaldehyde, the final product will be a halogenated (3-cyclohexen-1-yl)methyl 3-cyclohexenecarboxylate, or for the particular example above (1-chloro-3-cyclohexen-1-yl)-methyl 1-chloro-3-cyclohexenecarboxylate. When employing mixed aldehydes such as a halogenated aldehyde and a non-halogenated aldehyde or two different halogenated aldehydes, the final product will contain mixed esters from which the halogenated ester(s) can be recovered.

As is known and stated previously, cyclic unsaturated aldehydes can be synthesized by reacting an aliphatic conjugated diene such as butadiene or homologues thereof, with an alpha,beta-unsaturated aliphatic aldehyde, which reaction is well recognized as the Diels-Alder reaction. To prepare the halogen-substituted cyclic unsaturated aldehyde employed as starting material in the above-described Tischenko reaction, either or both of the above-said aliphatic conjugated diene or alpha,beta-unsaturated aliphatic aldehyde have halogen substituents such as, for example, chlorine or bromine as follows:

ALIPHATIC CONJUGATED DIENE

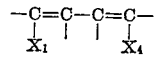

ALPHA,BETA-UNSATURATED ALDEHYDE

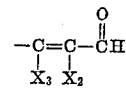

wherein at least one of the variables $X_1$, $X_2$, $X_3$ and $X_4$ is a halogen such as chlorine or bromine, and the remaining variables are hydrogen or an aliphatic hydrocarbon radical, preferably an alkyl radical such as methyl, ethyl, propyl, butyl and the like. The open bonds likewise can be to a hydrogen atom or to an aliphatic hydrocarbon radical, preferably an alkyl radical.

The following list of compounds will illustrate the wide variety of halogenated reactants which can be employed to produce the halogen-substituted cycloaliphatic unsaturated aldehydes suitable for use in the Tischenko reaction:

2-chloroacrolein and butadiene
2-bromoacrolein and 2-methylbutadiene
2-chlorocrotonaldehyde and 2,3-dimethylbutadiene
1-bromocrotonaldehyde and 1-bromobutadiene
2-bromocrotonaldehyde and 1,1-dimethylbutadiene
2-chloro-3-methylcrotonaldehyde and 1,4-dimethylbutadiene
3-bromo-2-methylacrolein and 1,1,3-trimethylbutadiene
2,3-dichloroacrolein and 1-chlorobutadiene
2,3-dibromoacrolein and 1,2-dimethylbutadiene
2,3-dichlorocrotonaldehyde and 2,3-dimethylbutadiene
2,3-dibromocrotonaldehyde and butadiene
2-chloro-2-pentenal and 1,4-dimethylbutadiene
2,3-dichlorocrotonaldehyde and 1,3-pentadiene
2-chloroacrolein and 1,3-pentadiene
1,1-dimethylbutadiene and 2-chlorocrotonaldehyde
2-chloroacrolein and 1-phenylbutadiene The preparation of non-halogenated cycloaliphatic unsaturated aldehydes is described in United States Patent 2,716,123, issued to Frostick, Jr., et al.

As can be readily seen from the above paired, exemplary list of compositions, when subjected to the Diels-Alder reaction, alkyl groups can be introduced into the final product by selecting the suitable starting material.

The novel halogenated diepoxide compounds depicted structually in Formula I above are useful for the synthesis of epoxy resin compositions having utility in the arts of moldings, coatings, laminates, adhesives and the like. The novel halogenated diepoxide compounds can be admixed with varying proportions of a polycarboxylic acid anhydride or a polycarboxylic acid which upon the application of heat for a sufficient period of time results in a rigid, moldable, solid, halogenated polyester type composition. On further application of heat, these compositions are converted into hard, infusible, scratch resistant resins having superior high temperature characteristics making them suitable for use in industrial applications where high heat distortion points are a prime requisite such as, for example, in laminates and moldings which are subjected to high temperature uses. The novel halogenated diepoxides can also be homopolymerized in the presence of Lewis acid catalysts which upon the application of heat for a sufficient period of time yield solid homopolymers which have utility in the adhesives, coatings and molding arts. These solid homopolymers can be machined to make a variety of useful products such as buttons, handles for tools, and the like. It has been further discovered, quite unexpectedly indeed, that homopolymers of the novel halogenated diepoxides and resin compositions comprising the novel halogenated diepoxide of the type alluded to above possess flame-resistant characteristics. Expressed differently, these resin compositions possess self-extinguishing properties when said resins are subjected to a torch or flame and the like. The halogenated diepoxide homopolymers and resins comprising the novel halogenated diepoxides of the type referred to above are the subject matter of the application of C. W. McGary, Jr., and C. T. Patrick, Jr., entitled "Halogenated Diepoxide Compositions," Ser. No. 663,354, filed June 4, 1957, and assigned to the same assignee as the present invention.

The following examples are illustrative.

*Example I.—Preparation of 1-chloro-3-cyclohexenecarboxaldehyde*

A mixture of 405 grams of 41 weight percent 2-chloroacrolein in ethylene dichloride solution (1.85 moles contained), said solution containing 8 grams of hydroquinone inhibitor, and 200 grams of butadiene (3.7 moles), said butadiene containing 0.02 weight percent t-butylcatechol inhibitor, was heated in a glass-lined autoclave at 100° C. for three hours. The reaction mixture was fractionated under reduced pressure to obtain 1-chloro-3-cyclohexenecarboxaldehyde having these properties:

Boiling range _____ 50°–55° C/5 mm. of Hg.
N 30/D _____ 1.4837.
Specific gravity 20/20° C ___ 1.146.
Purity by analytical bromination _____ 97.8 percent.
Purity by chlorine analysis___ 100.0 percent.

58.1% C (theory 58.1%); 6.6% H (theory 6.2%). The yield was 78 percent based on 2-chloroacrolein.

*Example II.—Preparation of (1-chloro-3-cyclohexen-1-yl)methyl 1-chloro-3-cyclohexenecarboxylate*

A mixture of 10 grams of aluminum isopropoxide catalyst and 50 grams of benzene was stirred at 25° C.–30° C. while 144.5 grams of 1-chloro-3-cyclohexenecarboxaldehyde (1 mole) were fed over a period of 5.5 hours. After a reaction period of 16 hours at 25° C., the reaction solution was treated with 100 milliliters of isopropyl ether and acidified with a solution of 17 milliliters of 37 percent hydrochloric acid dissolved in 100 milliliters of water. The aqueous layer was extracted with 50 milliliters of isopropyl ether. The oil and extract were combined and stripped to a kettle temperature of 110° C./7 mm. of Hg to obtain (1-chloro-3-cyclohexen-1-yl)methyl 1-chloro-3-cyclohexenecarboxylate as a residue product having these properties:

N 30/D _____ 1.5140.
Specific gravity 20/20° C____ 1.206.
Purity by analysis for chlorine_____ 98 percent.
Purity by analytical bromination___ 100.0 percent.
Molecular weight by Menzies-Wright method_____ 269 (theory 289).

The yield was 87 percent.

*Example III.—Preparation of (1 - chloro - 3,4 - epoxycyclohexan - 1 - yl)methyl 1 - chloro - 3,4 - epoxycyclohexenecarboxylate*

While 754 grams of (1-chloro-3-cyclohexen-1-yl)methyl 1-chloro-3-cyclohexenecarboxylate (2.61 moles) were stirred at 25° C.–30° C., 2588 grams of 18.4 weight percent peracetic acid in ethyl acetate solution (6.26 moles contained) were fed over a period of 80 minutes. After a reaction period of 19 hours at 25° C., the mixture was stripped to a kettle temperature of 70° C./8 mm. of Hg to obtain (1-chloro-3,4-epoxycyclohexan-1-yl)methyl 1-chloro-3,4-epoxycyclohexanecarboxylate having these properties:

N 30/D _____ 1.5088
Purity by analysis for epoxide _____percent__ 86.6
Doubly unsaturated starting material by analytical bromination _____percent__ 1.1
Yield (based on the epoxide analysis) ____do___ 87

*Example IV.—Preparation of 1-bromo-3-cyclohexenecarboxaldehyde*

A mixture of 537 grams of 36.2 weight percent 2-bromoacrolein in carbon tetrachloride solution (1.41 moles contained), said solution containing 2 grams of hydroquinone inhibitor, and 159 grams of butadiene (2.95 moles), said butadiene containing 0.02 weight percent t-butylcatechol inhibitor, was heated at 100° C. in a glass-lined autoclave for three hours. The crude product was fractionated under reduced pressure to obtain 1-bromo-3-cyclohexenecarboxaldehyde having these properties:

Boiling range _____ 72°–75° C./4 mm. of Hg.
N 30/D _____ 1.5187.
Specific gravity 20/20° C. ___ 1.465.
Purity by analytical bromination ___ 98.2 percent.
Purity by bromine analysis _____ 100.8 percent.
Yield (based on 2-bromoacrolein) __ 57 percent.

*Example V.—Preparation of (1-bromo-3-cyclohexen-1-yl)methyl 1-bromo-3-cyclohexanecarboxylate*

A solution of 18 grams of aluminum isopropoxide catalyst (0.26 equivalent) and 80 grams of benzene was stirred at 25° C.–30° C. while 275 grams of 1-bromo-3-cyclohexenecarboxaldehyde (1.455 moles) were fed over a period of three hours. After 20 hours at 25° C., the mixture was acidified with a solution of 30 milliliters of 37 percent hydrochloric acid in 200 milliliters of water. The aqueous layer was separated and extracted with 100 ml. of isopropyl ether. The oil and extract were combined and stripped to a kettle temperature of 80° C./3 mm. of Hg to obtain (1-bromo-3-cyclohexen-1-yl)methyl 1-bromo-3-cyclohexenecarboxylate as a viscous residue product having these properties:

N 30/D _____ 1.5448.
Purity by analytical bromination __ 91.4 percent.
Molecular weight by the Menzies-Wright method _____ 308 (theory 377.8).
Yield of residue product based on the bromoaldehyde _____ 82 percent.

*Example VI.—Preparation of (1 - bromo - 3,4 - epoxycyclohexan - 1 - yl)methyl 1 - bromo - 3,4 - epoxycyclohexanecarboxylate*

A solution of 216 grams of the residue product ester described in Example V (0.572 mole) and 100 milliliters of ethyl acetate was stirred at 25° C.–30° C. while 561 grams of 18.6 weight percent of peracetic acid in ethyl acetate solution (1.373 moles) were fed over a period of 1.5 hours. After a reaction period of 22 hours at 25° C., analysis for peracetic acid showed that 1.06 moles of peracetic acid had reacted. The mixture was stripped to a kettle temperature of 80° C./5 mm. to obtain 236 grams of residue product which was a viscous syrup at 80° C. and was glassy at 25° C. This product had the following properties:

Purity by bromine analysis _____ 97.3 percent.
Purity by analysis for epoxide ____ 57.0 percent.
Molecular weight by the Menzies-Wright method _____ 570 (theory 409.8).

These results indicated that some of the epoxide groups had polymerized.

Example VII.—Preparation of 1-chloro-2-methyl-4-cyclohexenecarboxaldehyde

A mixture of 344 grams of 2-chlorocrotonaldehyde (contained 3.4 grams of hydroquinone inhibitor) and 356 grams of butadiene (contained 0.02 weight percent t-butylcatechol inhibitor) was heated at 150° C. in a glass-lined autoclave for three hours. The crude product was fractionated under reduced pressure to obtain two fractions of 1-chloro-2-methyl-4-cyclohexenecarboxaldehyde having the properties listed in Table I.

| Fraction | Boiling range at 0.5 mm., °C. | N 30/D | Sp. gr., 20/20° | Percent purity [1] | Percent purity [2] |
|---|---|---|---|---|---|
| 3 | 50-56 | 1.4828 | 1.114 | 93.4 | 107.5 |
| 4 | 56-98 | 1.4868 | 1.119 | 96.6 | 104.8 |

[1] Determined by analytical bromination.
[2] Determined by analysis for chlorine.

Infrared and mass spectrographic studies on fractions 3 and 4 confirmed that they were predominantly 1-chloro-2-methyl-4-cyclohexenecarboxaldehyde. The wide boiling range was probably due to the presence of cis- and trans- isomers having different boiling points. Such isomers would probably result from the spatial arrangement of the chlorine, carbonyl and methyl groups relative to the plane of the ring.

The yield of 1-chloro-2-methyl-4-cyclohexanecarboxaldehyde was 31 percent and the efficiency was 50 percent based on 2-chlorocrotonaldehyde.

Example VIII.—Preparation of (1 - chloro - 2 - methyl- 4 - cyclohexen - 1 - yl)methyl 1 - chloro - 2 - methyl- 4 - cyclohexenecarboxylate A mixture of 10 grams of aluminum isopropoxide catalyst (0.114 equivalent) and 40 grams of the benzene was stirred at 25° C. while 142 grams of fractions 3 and 4 of Example VII (0.896 mole) were fed over a period of 40 minutes. After a reaction period of 23 hours at 25° C., the solution was stirred at 25°–35° C. while a solution of 17 milliliters of 37 percent hydrochloric acid in 100 milliliters of water was fed thereto. The aqueous layer was separated and extracted with 50 milliliters of benzene. The oil and extract were combined and stripped to a kettle temperature of 100° C./1.5 mm. of Hg to obtain (1 - chloro - 2 - methyl - 4 - cyclohexene - 1- yl)methyl 1 - chloro - 2 - methyl - 4 - cyclohexenecarboxylate having these properties:

N 30/D_____ 1.5138.
Molecular weight, Menzies-Wright method_____ 282 (theory 317).
Purity by analytical bromination____ 86.6 percent.

The yield was 45 percent at an efficiency of 90 percent.

Example IX.—Preparation of (1 - chloro - 2 - methyl- 4,5 - epoxyclohexan - 1 - yl)methyl 1 - chloro - 2- methyl - 4,5 - epoxycyclohexenecarboxylate A solution of 51 grams of (1 - chloro - 2 - methyl - 4- cyclohexen - 1 - yl)methyl 1 - chloro - 2 - methyl - 4 - cyclohexenecarboxylate (0.161 mole) in 50 milliliters of ethyl acetate was stirred at 25° C. while 118 grams of 23 percent peracetic acid in ethyl acetate solution (0.354 mole) was fed over a period of two hours. After a reaction period of 20 hours at 25° C., the solution contained 0.09 mole of peracetic acid by analysis. The solution was diluted with 200 grams of ethylbenzene and stripped to a kettle temperature of 70° C./6 mm. of Hg to obtain (1 - chloro - 2 - methyl - 4,5 - epoxycyclohexan - 1 - yl)- methyl 1 - chloro - 2 - methyl - 4,5 - epoxycyclohexenecarboxylate having these properties:

N 30/D_____ 1.5160.
Purity by analysis for chlorine_____ 103.5 percent.
Purity by analysis for epoxide with hydrogen bromide_____ 63.4 percent.
Molecular weight by Menzies-Wright method_____ 347 (theory 349).

The yield of residue product was 89 percent.

Reasonable variations and modifications of this invention can be made or carried out in the light of the above disclosure without departing from the spirit and scope thereof.

What is claimed is:

1. A diepoxide represented by the general formula:

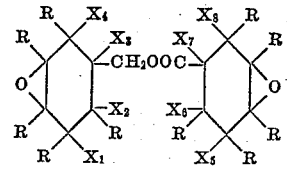

wherein each R is individually selected from the group consisting of hydrogen and a lower alkyl radical; $X_1$ through $X_8$ are selected from the group consisting of hydrogen, halogen, and a lower alkyl radical; and at least one of the variables designated as $X_1$ through $X_8$ always being a halogen.

2. Lower alkyl - substituted (1 - halo - 3,4 - epoxycyclohexan - 1 - yl)methyl 1 - halo - 3,4 - epoxycyclohexancarboxylate.

3. Lower alkyl - substituted (2 - halo - 3,4 - epoxycyclohexan - 1 - yl)methyl 2 - halo - 3,4 - epoxycyclohexanecarboxylate.

4. Lower alkyl - substituted (5 - halo - 3,4 - epoxycyclohexan - 1 - yl)methyl 5 - halo - 3,4 - epoxycyclohexanecarboxylate.

5. Lower alkyl - substituted (6 - halo - 3,4 - epoxycyclohexan - 1 - yl)methyl 6 - halo - 3,4 - epoxycyclohexanecarboxylate.

6. (1 - halo - 3,4 - epoxycyclohexan - 1 - yl)methyl 1 - halo - 3,4 - epoxycyclohexanecarboxylate.

7. (2 - halo - 3,4 - epoxycyclohexan - 1 - yl)methyl 2 - halo - 3,4 - epoxycyclohexanecarboxylate.

8. (5 - halo - 3,4 - epoxycyclohexan - 1 - yl)methyl 5 - halo - 3,4 - epoxycyclohexanecarboxylate.

9. (6 - halo - 3,4 - epoxycyclohexan - 1 - yl)methyl 6 - halo - 3,4 - epoxycyclohexanecarboxylate.

10. (1 - chloro - 3,4 - epoxycyclohexan - 1 - yl)methyl 1 - chloro - 3,4 - epoxycyclohexanecarboxylate.

11. (2 - chloro - 3,4 - epoxycyclohexan - 1 - yl)methyl 2 - chloro - 3,4 - epoxycyclohexanecarboxylate.

12. (5 - chloro - 3,4 - epoxycyclohexan - 1 - yl)methyl 5 - chloro - 3,4 - epoxycyclohexanecarboxylate.

13. (6 - chloro - 3,4 - epoxycyclohexan - 1 - yl)methyl 6 - chloro - 3,4 - epoxycyclohexanecarboxylate.

14. (1 - bromo - 3,4 - epoxycyclohexan - 1 - yl)methyl 1 - bromo - 3,4 - epoxycyclohexanecarboxylate.

15. (1 - chloro - 2 - methyl - 4,5 - epoxycyclohexan - 1- yl)methyl 1 - chloro - 2 methyl - 4,5 - epoxycyclohexanecarboxylate.

References Cited in the file of this patent
UNITED STATES PATENTS 2,716,123    Frostick et al. _____ Aug. 23, 1955